United States Patent
Hehmann et al.

(10) Patent No.: US 8,681,962 B2
(45) Date of Patent: Mar. 25, 2014

(54) METHOD FOR A TELECOMMUNICATION'S NETWORK, CENTRAL OFFICE, AND NETWORK TERMINATING UNIT

(75) Inventors: Jörg Hehmann, Weil der Stadt (DE); Thomas Pfeiffer, Stuttgart (DE)

(73) Assignee: Alcatel Lucent, Paris (FR)

(\*) Notice: Subject to any disclaimer, the term of this patent is extended or adjusted under 35 U.S.C. 154(b) by 0 days.

(21) Appl. No.: 13/504,818

(22) PCT Filed: Oct. 26, 2010

(86) PCT No.: PCT/EP2010/066174
§ 371 (c)(1), (2), (4) Date: Apr. 27, 2012

(87) PCT Pub. No.: WO2011/067038
PCT Pub. Date: Jun. 9, 2011

(65) Prior Publication Data
US 2012/0219143 A1    Aug. 30, 2012

(30) Foreign Application Priority Data
Dec. 3, 2009    (EP) .................................... 09306174

(51) Int. Cl.
H04M 3/42    (2006.01)
H04M 7/00    (2006.01)
H04M 3/00    (2006.01)
H04M 5/00    (2006.01)

(52) U.S. Cl.
USPC ................. 379/201.12; 379/201.02; 379/229; 379/231; 379/242; 379/243

(58) Field of Classification Search
USPC ............ 379/201.02, 201.03, 201.12, 220.01, 379/222, 224, 229, 242, 243, 245
See application file for complete search history.

(56) References Cited

U.S. PATENT DOCUMENTS

| | | | | |
|---|---|---|---|---|
| 5,644,619 A | * | 7/1997 | Farris et al. | 379/29.01 |
| 5,650,994 A | * | 7/1997 | Daley | 370/259 |
| 6,002,502 A | * | 12/1999 | Pomp et al. | 398/45 |
| 6,298,123 B1 | * | 10/2001 | Nolting et al. | 379/111 |
| 6,608,891 B1 | * | 8/2003 | Pelletier et al. | 379/207.02 |
| 2002/0122548 A1 | * | 9/2002 | Geck et al. | 379/229 |
| 2002/0141428 A1 | * | 10/2002 | Posthuma | 370/419 |
| 2007/0022469 A1 | * | 1/2007 | Cooper et al. | 726/3 |
| 2007/0110441 A1 | * | 5/2007 | Saito et al. | 398/71 |
| 2008/0037563 A1 | * | 2/2008 | Bernard | 370/401 |
| 2009/0319572 A1 | * | 12/2009 | Bernard | 707/104.1 |

OTHER PUBLICATIONS

International Search Report PCT Form PCT/ISA/210.

\* cited by examiner

*Primary Examiner* — Khai N Nguyen
(74) *Attorney, Agent, or Firm* — Harness, Dickey & Pierce

(57) ABSTRACT

The invention relates to a method for a telecommunication's network with a central office (CO), an access network (AN), a multiple of network terminating units (DPD) and customer premises equipment (CPE) connected thereto, to assign a customer premises equipment (CPE) to a service contract (SI) registered in the central office (CO), in which, when the network terminating units (DPD) are identifiable unambiguously and individually and when the customer premises equipment (CPE) is identifiable unambiguously, the service contract (SI) is assigned to a particular customer premises equipment (CPE) as a result of an action (OS) of a network terminating unit (DPD) being recognizable by the central office (CO) and being coordinated with signals sent from a customer premises equipment (CPE) connected to said network terminating unit (DPD), and in which such coordination is detected in the central office (CO) for assignment, to a central office, and to a network terminating unit.

6 Claims, 4 Drawing Sheets

METHOD FOR A TELECOMMUNICATION'S NETWORK, CENTRAL OFFICE, AND NETWORK TERMINATING UNIT

The invention relates to a method for a telecommunication's network with a central office, an access network, a multiple of network terminating units and customer premises equipment connected thereto, to assign a customer premises equipment to a service contract registered in the central office, to a central office according to the preamble of claim 6, and to a network terminating unit for such network.

Both, optical and wireless access networks normally are point-to-multipoint networks. Each customer has a connection point, where he or she can connect whatever customer premises equipment like simple telephones, servers, or multimedia devices. Such connecting equipment is being done by the customer himself or herself and can also be changed at whatever time. There is a need to register the used equipment in the central office of the network operator and to unambiguously assign it to a customer's service contract.

To this end it is known that the customer performs a certain procedure, in the course of which a code received from the operator is to be entered. Such registration procedure is time consuming, cumbersome and error-prone.

The invention deals with the problem of providing a method and respective devices to assign a customer premises equipment to a service contract registered in the central office of the network operator.

This problem according to the invention is solved by a method by a central office and by a network terminating unit.

Nowadays nearly every electronic device is assigned a unique identifier and either can be addressed using such identifier or can establish contacts using such identifier. Network operators often insist on terminating their network with each customer by a device being separated from any customer's devices and being in their own responsibility. It is known also that such network terminating units also are assigned unambiguous and individual identifiers with similar feature, namely that they can be addressed using such identifier or can establish contacts using such identifier. Such network terminating units are installed under the responsibility of the network operator, who thus knows the customer in whose location such network terminating unit is installed.

Under such circumstances whenever a concerted action of such network terminating unit and a customer premises equipment can be provoked and recognized at the central office an assignment can be reached by evaluating synchronized results of such concerted action.

Further embodiments of the invention can be found in the sub-claims and in the accompanying description.

In the following the invention will be described with reference to the accompanying drawing, in which FIG. 1 shows four stages of an embodiment of a method according to the invention performed in a telecommunication's network with a central office according to the invention and a demarcation point unit as an embodiment of a network terminating unit according to the invention.

Figure 1:
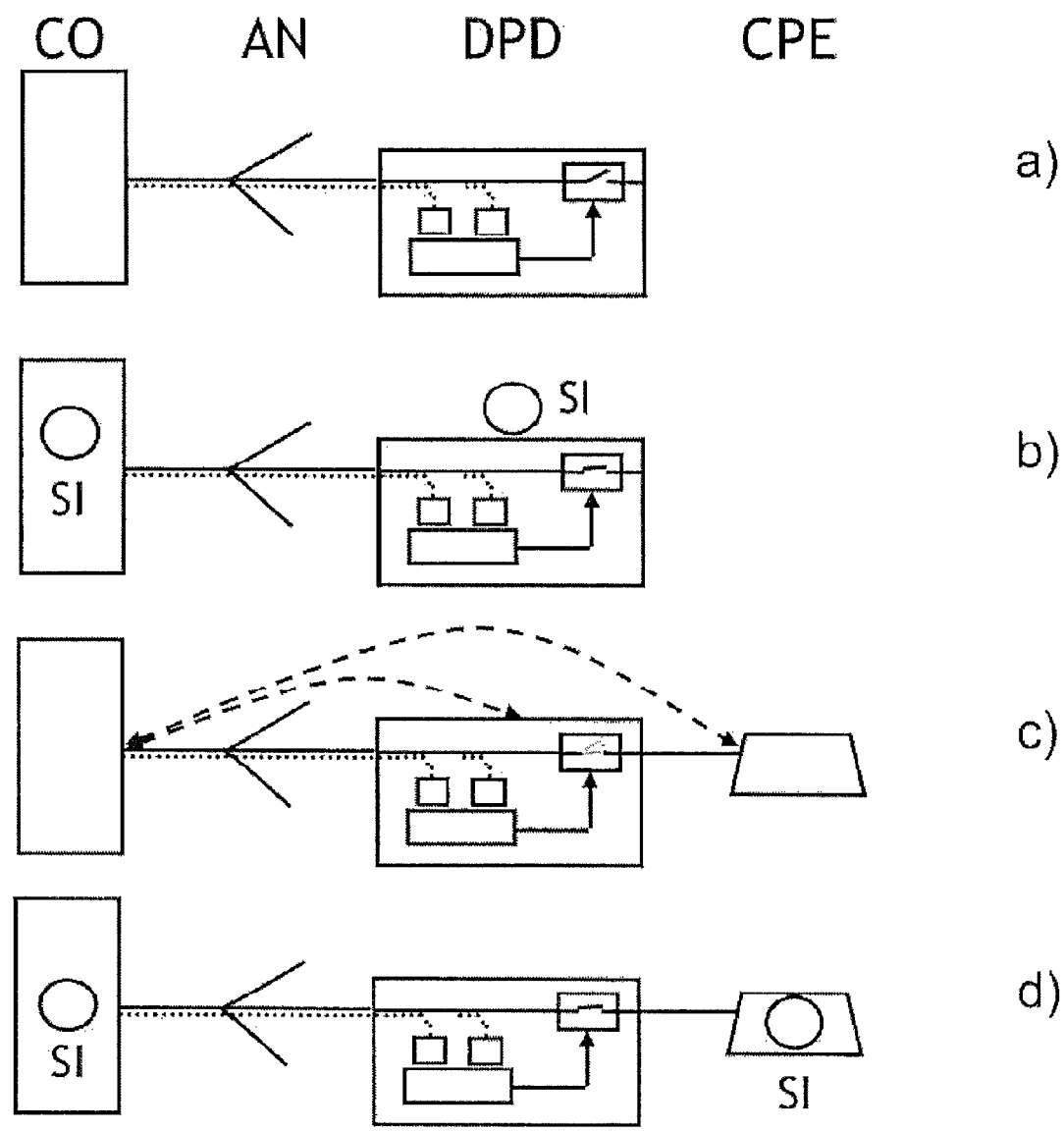

Stage d) in FIG. 1 shows the situation in normal operation of a telecommunication's network with a central office CO, an access network AN including splitters, not labeled, a multiple (only one shown) of demarcation point devices DPD as examples of network terminating units, and customer premises equipment CPE connected to those demarcation point devices DPD.

The central office CO at the left is marked with a service indicator SI indicating that a certain customer, namely the one shown here, has a service contract with the network operator owing the central office CO. Such service contract is registered in a register including inter alia data relating to the customer, data relating to the service or services to be rendered, and data relating to the equipment, to which such service or services is or are to be rendered. The latter here is marked with a further service indicator SI in the customer premises equipment CPE involved. The demarcation point device DPD, to which this customer premises equipment CPE is connected, is shown with an optical through-connection between the access AN and the customer premises equipment CPE. The demarcation point device DPD will be described below in further detail.

With central office here is meant some kind of configuration of those devices in the sphere of the network operator that include at least the mentioned registers and the interface to the access network.

Figure 2:
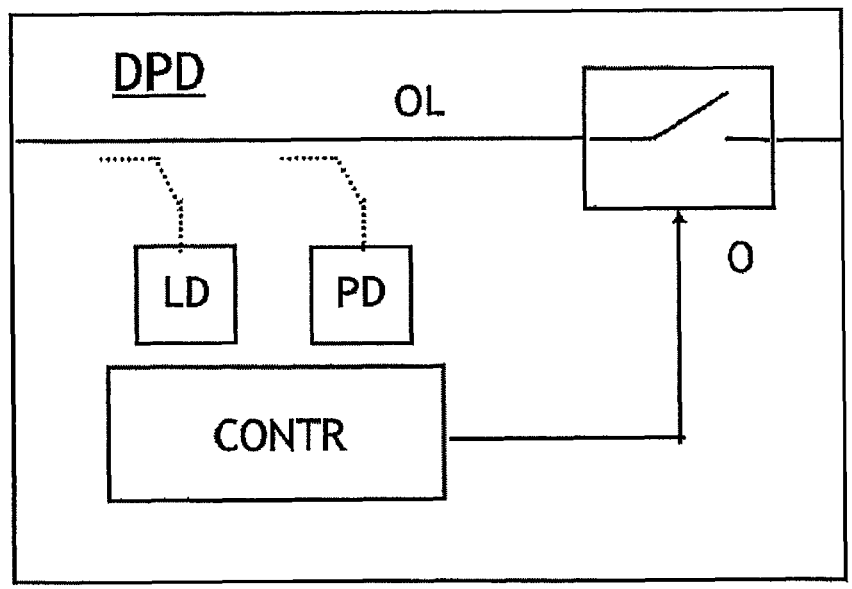
FIG. 2 shows a block diagram of a demarcation point unit as used in the example of FIG. 1.

Before describing the other stages shown in FIG. 1 for better understanding the block diagram of a demarcation point device used in the example of FIG. 1 is described with reference to FIG. 2.

The demarcation point device DPD mainly is an optical through-connection with some additional parts for influencing or monitoring the optical traffic. In this example we have an optical line OL passing through an optical switch OS. This Optical switch OS is controlled by a controller CONTR, basically a microprocessor. The controller CONTR cooperates with the central office CO by means of a laser diode LD for sending data and a photo diode PD for receiving data. Both, laser diode LD and photo diode PD are coupled to the optical line OL by means of, not labeled, optical couplers.

For communicating between the controller CONTR the demarcation point device DPD and the central office CO principally could be performed using the anyway existing protocols treating the demarcation point device DPD as a further terminal like the ones in the customer premises equipment CPE. It is also suggested to use an additional optical data connection using a much lower data transmission rate than the one to the customer premises equipments. Such superimposed additional optical data connection would not influence the main communication and would be sufficient for this purpose. In addition it would result in a much lower power requirement of the controller CONTR in the demarcation point device DPD.

An example of such demarcation point device and the communication used between the demarcation point device and the central office is known from EP 2 104 250 A1.

Now back to FIG. 1, stage a) shows the situation where a new customer's equipment is not yet installed. We have here only an optical access line from the central office CO to the demarcation point device DPD without a customer premises equipment CPE connected. Under these circumstances the optical switch OS in the demarcation point device DPD is open and even the connecting of such customer premises equipment CPE would be without consequences.

Between the central office CO and the demarcation point device DPD an optical control connection is present and represented by dotted lines.

The next step to be taken by a customer is shown in stage b). He first has to make a service contract with his network operator. Of course he may also make a contract with a service provider who than makes a respective contract with the network operator.

Such service contract, as already mentioned, is registered in a register including inter alia data relating to the customer, data relating to the service or services to be rendered, and data relating to the equipment, to which such service or services is or are to be rendered. The entry in such register is represented by a service indicator SI. In this register also the demarcation point device DPD to which this customer is allowed to connect, is recorded. This fact is represented in the drawing by a further service indicator SI next to the demarcation point device DPD. In order that the customer now can connect his equipment, the optical switch OS now is closed.

In stage c) the customer now connects his customer premises equipment CPE to his demarcation point device DPD. The customer premises equipment CPE starts communicating with the central office CO, as shown with a dashed line (of course such communication is effected via the optical access network). At that moment the central office CO can not be aware of via which demarcation point device DPD such communication is conducted. The customer now may cause his demarcation point device DPD to start an assignment process.

To this end in the demarcation point device DPD the optical switch OS is opened and closed in a characteristic course of time in cooperation with the central office CO. Such cooperation can result from reportings on the dotted communication channel, also shown with a dashed line. Whenever the optical switch OS is opened, the starting communication between the customer premises equipment CPE and the central office CO is interrupted and resumed after its closing again. From the synchronism between the starts of communication and the activating the optical switch OS, the central office CO can make the necessary assignment between the customer premises equipment CPE and the respective demarcation point device DPD. After such assignment the already described stage d) is reached.

Figure 3:
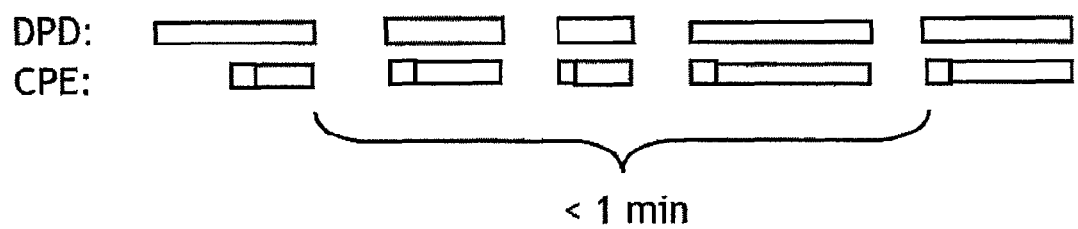
FIG. 3 shows signals between a central office and both, a demarcation point device and a customer premises equipment connected thereto, in one example of an embodiment of a method according to the invention.

This assignment procedure also is illustrated in FIG. 3.

Such causing the demarcation paint device DPD to start an assignment process simply could be reached by the customer pressing a key at his demarcation point device DPD. Alternatively the plug via which the customer premises equipment CPE is connected to the demarcation point device DPD could present a switch being operated when plugging in the connection. When the demarcation point device DPD is powered from the customer premises equipment CPE, also such powering can be the trigger to cause the assignment process. Until then of course an other powering is to be foreseen like a battery or even in a photo voltaic way via the optical access.

The triggering of the assignment process in principle could also be effected by the central office CO. But as at that moment the central office CO only recognizes communication from whatever new device, an immediate and direct instructing the demarcation point device DPD via which the communication occurs, is impossible. It can only be done by polling techniques, meaning that all, all not yet operative or at least all demarcation point devices DPD with until then assigned service indicators SI with not yet registered customer premises equipment CPE one by one are instructed to start an assignment process.

Such polling technique is better indicated in cases where for whatever reason a restart or a check of the whole access net work or at least a major part thereof is to be performed. But for this a switched attenuation rather than a switched interruption should be foreseen. During this polling process the normal operation hereby is not interrupted. The reduced input level can be either reported from the customer premises equipment CPE to the central office CO or can be measured there. Also here from the synchronism between the starts of reducing the power level and the activating the optical attenuator, the central office CO can make the necessary assignment between the customer premises equipment CPE and the respective demarcation point device DPD.

Figure 4:
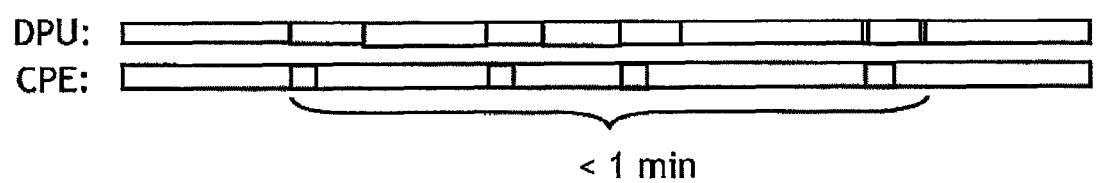
FIG. 4 shows signals between a central office and both, a demarcation point device and a customer premises equipment connected thereto, in an other example of an embodiment of a method according to the invention.

The latter example is illustrated in FIG. 4.

Figure 5:
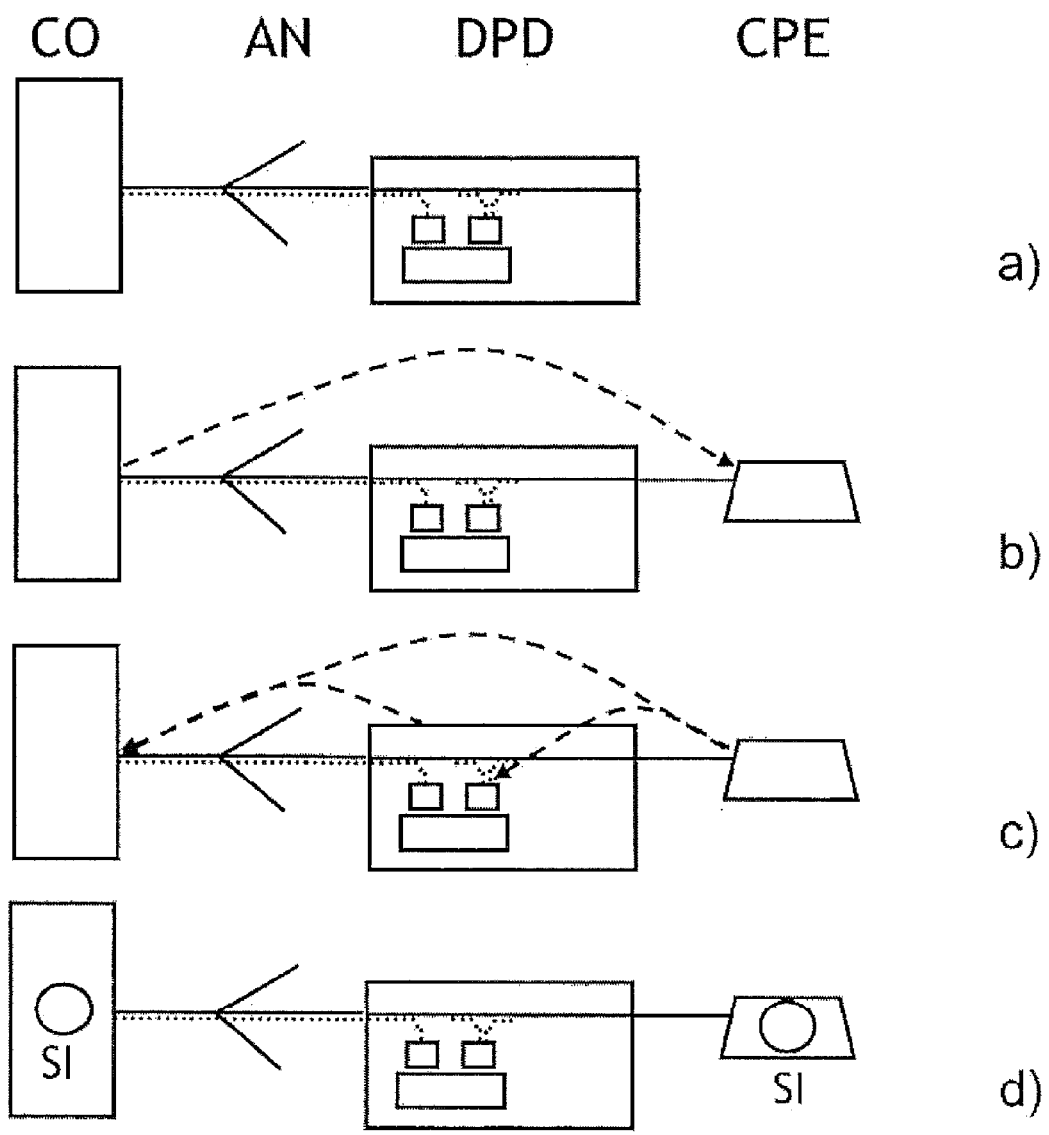
FIG. 5 shows four stages of an other embodiment of a method according to the invention performed in a telecommunication's network with a central office according to the invention and a demarcation point unit as an embodiment of a network terminating unit according to the invention.

A further example of an embodiment of the present invention is illustrated in FIG. 5.

The demarcation point devices DPD used here needs not be in position to influence the communication between the customer premises equipment CPE and the central office CO, but needs to be in position to detect also the traffic from the customer premises equipment CPE to the central office CO. To this end the photo diode in the demarcation point device DPD also needs a coupling in the direction versus there. There is not necessarily a need to access to the contents of such traffic. It is sufficient to recognize the fact that there is such traffic.

Stage a) shows the situation before a customer premises equipment CPE is connected. After connecting, the customer premises equipment CPE starts communicating with the central office CO, dashed line, stage b). This communication is monitored in the demarcation point device DPD and reported to the central office CO, further dashed lines, stage c). Also here from the synchronism between the starts of communication and the recognizing and reporting the communication, the central office CO can make the necessary assignment between the customer premises equipment CPE and the respective demarcation point device DPD, stage d).

Figure 6:
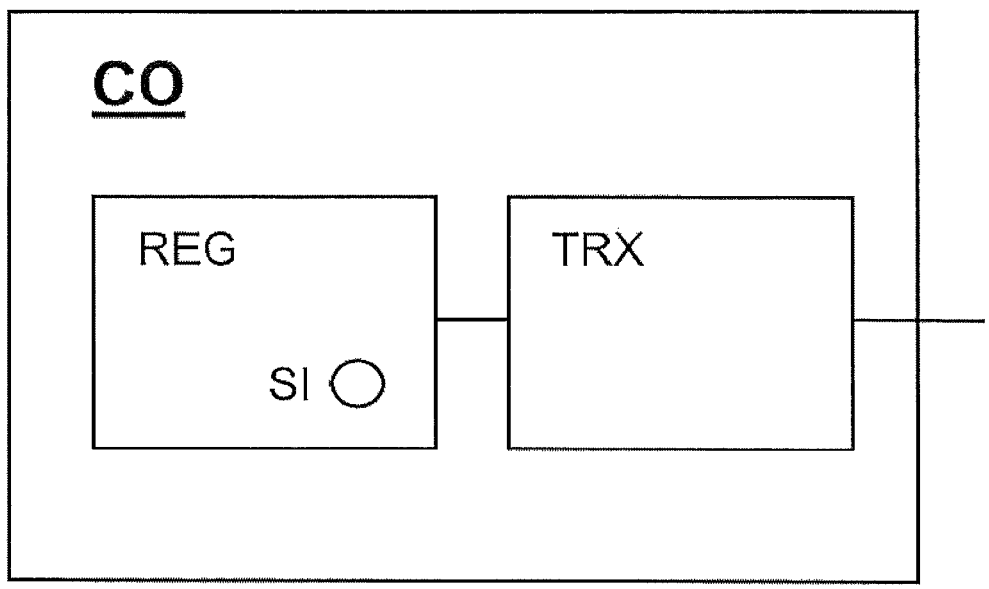
FIG. 6 shows an example of an embodiment of a central office according to the invention.

To complete the description, based on FIG. 6 a central office CO according to the invention is being described:

The central office CO mainly includes two units, namely an optical transceiver TRX and a register REG. As already mentioned these two units need not be at one and the same location and need not necessarily be under the responsibility of the same operator. A register REG can also be in cooperation with more than one transceiver TRX. And it needs not absolutely been excluded that a transceiver cooperates with more than one register.

The optical transceiver TRX inter alia is responsible for interfacing to the optical access network by converting from the optical into the electrical domain and vice-versa, and, what is more important in this context, it is responsible for recognizing an action of a demarcation point device DPD acting as network terminating unit and the coordination therewith with signals sent to the central office CO from a customer premises equipment CPE connected to the network terminating unit.

The register REG is responsible for holding customer related data; of interest here are data assigning customer premises equipments CPEs to service contracts SIs.

The invention claimed is:

1. Method for a telecommunication's network with a central office, an access network, a multiple of network terminating units and customer premises equipment connected thereto, to assign the customer premises equipment to a service contract registered in the central office, wherein when the network terminating units are identifiable unambiguously and individually and when the customer premises equipment is identifiable unambiguously, the service contract is assigned to a particular customer premises equipment as a result of an action of a network terminating unit being recognizable by the central office and being coordinated with signals sent from the customer premises equipment connected to said network terminating unit, and that such coordination is detected in the central office for assignment, wherein the network terminating unit detects at least a first-time start of information transfer between the customer premises equipment connected to the network terminating unit and the central office and reports this to the central office and that the central office performs the assignment based on a chronology of the start of an information transfer from the customer premises equipment and the reporting by the network terminating unit.

2. Method according to claim 1, wherein the network terminating unit in cooperation with the central office affects information transfer between the customer premises equipment connected to the network termination unit and the central office in a characteristic way and that in the central office the required assignment is performed by comparing to time the result of the characteristic affectation performed by the network terminating unit with the unambiguous identification of the customer premises equipment involved in the information transfer affected in the characteristic way.

3. Method according to claim 2, wherein the method is performed on occasion of the connection of the customer premises equipment, and that the affecting the information transfer in a characteristic way is performed by interrupting the information multiple times in a characteristic way, in what way the customer premises equipment multiple times resumes the information transfer using the unambiguous identification.

4. Method according to claim 2, wherein the affecting the information transfer in a characteristic way is performed by reducing the level of the information transfer multiple times in a characteristic way by attenuation whereby the information transfer with the customer premises equipment is assignable unambiguously to the network terminating unit performing the attenuation.

5. A system for a telecommunication's network with a central office, an access network, a multiple of network terminating units and customer premises equipment connected thereto, characterised in, comprising:

recognition means for recognizing an action of a network terminating unit with signals sent to the central office from the customer premises equipment connected to the network terminating unit, and that the central office includes assignment means for assigning a particular customer premises equipment to a service contract registered in the central office;

wherein the assignment means detects at least a first-time start of information transfer between the customer premises equipment and the central office and performs the assignment based on a chronology of the start of an information transfer from the customer premises equipment and the reporting by the network terminating unit.

6. Network terminating unit for a telecommunication's network with a central office, an access network, a multiple of network terminating units and customer premises equipment connected thereto, wherein each network terminating unit includes control means for recognizing signals sent from the customer premises equipment connected to the control means to the central office signals sent from the central office to a customer premises equipment, and for coordinating in time with the central office such recognizing, wherein each of the network terminating units is configured to detect at least a first-time start of information transfer between the customer premises equipment connected to the network terminating unit and the central office and report this to the central office to initiate assignment of the customer premises equipment to the network terminating unit based on a chronology of the start of an information transfer from the customer premises equipment and the reporting by the network terminating unit.

\* \* \* \* \*